US011827236B2

(12) United States Patent
Lee et al.

(10) Patent No.: US 11,827,236 B2
(45) Date of Patent: Nov. 28, 2023

(54) AUTOMOTIVE SENSOR INTEGRATION MODULE AND SYSTEM USING THE SAME

(71) Applicant: HYUNDAI MOBIS CO., LTD., Seoul (KR)

(72) Inventors: Sang Hun Lee, Yongin-si (KR); Seung Bum Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 379 days.

(21) Appl. No.: 16/726,607

(22) Filed: Dec. 24, 2019

(65) Prior Publication Data

US 2021/0122386 A1    Apr. 29, 2021

(30) Foreign Application Priority Data

Oct. 24, 2019  (KR) .................. 10-2019-0133133

(51) Int. Cl.
*B60W 50/08*    (2020.01)
*G01S 13/86*    (2006.01)
*G01S 7/40*    (2006.01)
*B60W 50/06*    (2006.01)
*G01S 13/931*    (2020.01)
*B60R 16/023*    (2006.01)
*B60W 50/00*    (2006.01)

(52) U.S. Cl.
CPC .......... *B60W 50/08* (2013.01); *B60R 16/023* (2013.01); *B60W 50/06* (2013.01); *G01S 7/40* (2013.01); *G01S 13/865* (2013.01); *G01S 13/867* (2013.01); *G01S 13/931* (2013.01); *B60W 2050/0043* (2013.01); *B60W 2556/35* (2020.02); *G01S 2013/93271* (2020.01); *G01S 2013/93272* (2020.01)

(58) Field of Classification Search
None
See application file for complete search history.

(56) References Cited

U.S. PATENT DOCUMENTS

2016/0129789 A1    5/2016  Halford et al.
2018/0088584 A1*   3/2018  Tascione .............. G05D 1/0276
2018/0159647 A1*   6/2018  Nayyar .................. H04L 12/40
(Continued)

FOREIGN PATENT DOCUMENTS

KR    10-2016-0013736    2/2016

OTHER PUBLICATIONS

Qun Li and D. Rus, "Global clock synchronization in sensor networks," in IEEE Transactions on Computers, vol. 55, No. 2, pp. 214-226, Feb. 2006, doi: 10.1109/TC.2006.25. (Year: 2006).*
(Continued)

*Primary Examiner* — Christian Chace
*Assistant Examiner* — Shayne M. Gilbertson
(74) *Attorney, Agent, or Firm* — H.C. Park & Associates, PLC

(57) ABSTRACT

An automotive sensor integration module including a plurality of sensors configured to detect an object outside a vehicle, and a signal processing unit configured to output, as sensing data, a plurality of pieces of detection data output from the plurality of sensors according to any one among the plurality of pieces of detection data at a substantially same timing based on a priority signal, or output, as the sensing data, the plurality of pieces detection data according to an external pulse at a substantially same timing.

6 Claims, 7 Drawing Sheets

(56) References Cited

U.S. PATENT DOCUMENTS

2019/0069051 A1\* 2/2019 Al-Stouhi ................ H04Q 9/00
2020/0200869 A1\* 6/2020 Alvarez .................. G01S 17/86
2021/0383133 A1\* 12/2021 Wang .................... G01S 13/867

OTHER PUBLICATIONS

Kr Office Action dated Jun. 30, 2023, in KR Application No. 10-2019-0133133.

\* cited by examiner

AUTOMOTIVE SENSOR INTEGRATION MODULE AND SYSTEM USING THE SAME

CROSS-REFERENCE TO RELATED APPLICATION

This application claims priority from and the benefit of Korean Patent Application No. 10-2019-0133133, filed on Oct. 24, 2019, which is hereby incorporated by reference for all purposes as if set forth herein.

BACKGROUND

Field

Exemplary embodiments relate to an automotive sensor integration module and more particularly, to a system using the same.

Discussion of the Background

As technology becomes more advanced, various sensors, electronic devices, and the like are also provided in a vehicle for user convenience. In particular, research regarding an advanced driver assistance system (ADAS) has been actively conducted for users' driving convenience. Furthermore, the development of autonomous vehicles is actively under way.

The ADAS and the autonomous vehicles require a large number of sensors and electronic devices to identify objects outside a vehicle.

Referring to FIG. 1, in order to detect objects in front of a vehicle, a camera, a lidar, a radar sensor, etc. are disposed in front of the vehicle, but are disposed at different positions respectively.

Although objects should be identified on the basis of detection results detected by sensors at the same timing in order to improve performance in detecting objects, it becomes difficult to synchronize object detection sensors because the sensors are disposed at different positions.

The above information disclosed in this Background section is only for enhancement of understanding of the background of the invention and, therefore, it may contain information that does not constitute prior art.

SUMMARY

Exemplary embodiments of the present invention provide an automotive sensor integration module in which a plurality of synchronized sensors are arranged, and a system using the same.

Exemplary embodiments of the present invention are also provided to synchronize a plurality of outputs of an automotive sensor integration module.

The inventive features are not limited to the above-mentioned exemplary embodiments, and other aspects and advantages of the present invention, which are not mentioned, will be understood through the following description, and will become apparent from the embodiments of the present invention. Furthermore, it will be understood that aspects and advantages of the present invention can be achieved by the means set forth in the claims and combinations thereof.

An exemplary embodiment of the present invention provides an automotive sensor integration module including a plurality of sensors configured to detect an object outside a vehicle; and a signal processing unit configured to output, as sensing data, a plurality of pieces of detection data output from the plurality of sensors according to any one among the plurality of pieces of detection data at a substantially same timing based on a priority signal, or output, as the sensing data, the plurality of pieces detection data according to an external pulse at a substantially same timing.

Another exemplary embodiment of the present invention provides a system including a first automotive sensor integration module including a plurality of first sensors and configured to output an external pulse and first sensing data; and a second automotive sensor integration module including a plurality of second sensors and configured to output second sensing data based on the outputs from the first automotive sensor integration module.

Another exemplary embodiment of the present invention provides a system including a plurality of automotive sensor integration modules configured to synchronize a plurality of pieces of detection data output from a plurality of sensors and output the synchronized detection data as sensing data; and an upper-level control device configured to provide an activated priority signal only to any one automotive sensor integration module among the plurality of automotive sensor integration modules, and provide a deactivated priority signal to remaining automotive sensor integration modules.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
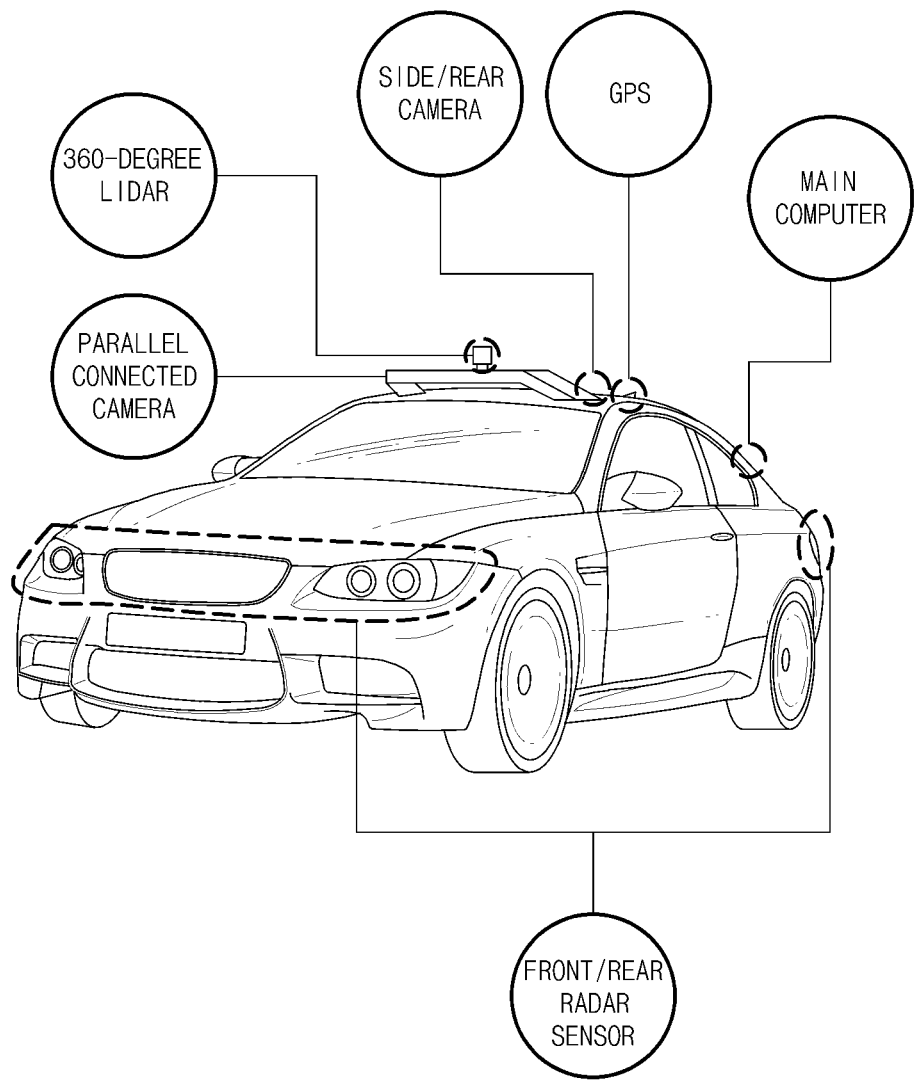
FIG. 1 illustrates an external appearance of an autonomous vehicle.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

When a certain element is referred to as being "on (or under)" another element, the certain element may be disposed in contact with the upper surface (or lower surface) of the other element or an intervening element may be present between the other element and the certain element disposed on (or under) the other element.

Furthermore, it will be understood that when a certain element is referred to as being "connected to" or "coupled to" another element, these elements may be directly connected or coupled to each other, but an intervening element may be "interposed" therebetween, or the elements may be connected or coupled to each other via another element.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 2:
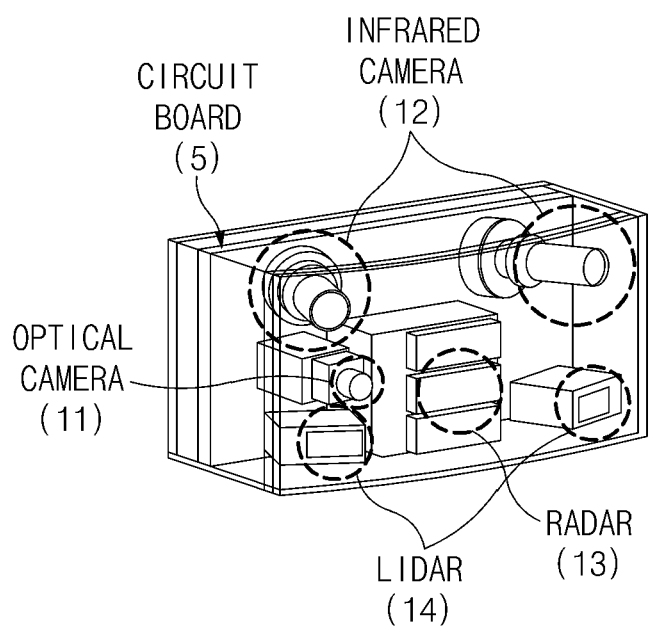
FIG. 2 is an outline drawing of an automotive sensor integration module according to an exemplary embodiment of the present invention.

FIG. 2 is an outside view of an automotive sensor integration module 100 according to an exemplary embodiment of the present invention.

An automotive sensor integration module 100 according to an exemplary embodiment of the present invention may include a plurality of devices and sensors for detecting objects outside a vehicle to acquire safety information related to vehicle driving. In this case, the objects may include a lane, another vehicle, a pedestrian, a two-wheeled vehicle, a traffic signal, light, a road, a structure, a speed bump, a geographical feature, an animal, etc.

The lane may be a driving lane, a lane next to the driving lane, or a lane in which an vehicle travels in an opposite direction. The lane may include left and right lines forming a lane.

Another vehicle may be a vehicle that is travelling in the vicinity of a host vehicle. The other vehicle may be a vehicle within a predetermined distance from the host vehicle. For example, the other vehicle may be a vehicle that is located within a predetermined distance from the host vehicle and precedes or follows the host vehicle.

The pedestrian may be a person in the vicinity of a host vehicle. The pedestrian may be a person located within a predetermined distance from the host vehicle. For example, the pedestrian may be a person on a sidewalk or the roadway within a predetermined distance from the host vehicle.

The two-wheeled vehicle may be a vehicle that is located in the vicinity of a host vehicle and moves using two wheels. The two-wheeled vehicle may be a vehicle that has two wheels and is located within a predetermined distance from the host vehicle. For example, the two-wheeled vehicle may include a motorcycle or a bicycle on a sidewalk or the roadway within a predetermined distance from the vehicle.

The traffic signal may include a traffic light, a traffic sign, a pattern or text drawn on a road surface.

The light may include light from a lamp in another vehicle, light from a street lamp, or light emitted from the sun.

The road may include a road surface, a curve, and a slope such as an upward slope and a downward slope.

The structure may be an object which is located around the road and fixed onto the ground. For example, the structure may include a streetlight, a roadside tree, a building, a power pole, a traffic light, a bridge, etc.

The geographical feature may include a mountain, a hill, etc.

Meanwhile, the objects may be classified into a moving object and a stationary object. For example, the moving object may conceptually include another vehicle, a two-wheeled vehicle, a pedestrian, etc., while the stationary object may conceptually include a traffic signal, a road, a structure, etc.

As such, it may be desirable to use various sensors and devices to accurately identify various objects around a vehicle.

In order to accurately identify objects outside a vehicle, an automotive sensor integration module 100 according to an exemplary embodiment of the present invention may include a plurality of different types of sensors and devices. In addition, the automotive sensor integration module 100 according to an exemplary embodiment of the present invention may include at least one sensor and device of the same type.

Referring to FIG. 2, the automotive sensor integration module 100 according to an exemplary embodiment of the present invention may include an infrared camera 12, an optical camera 11, a lidar 14, and a radar 13 as sensors to identify an object outside a vehicle. The automotive sensor integration module 100 according to an exemplary embodiment of the present invention illustrated in FIG. 2 is exemplarily shown to include an infrared camera 12, an optical camera 11, a lidar 14, and a radar 13 as sensors in order to identify an object, but the inventive concepts are not limited thereto. In addition, the automotive sensor integration module 100 according to an exemplary embodiment of the present invention illustrated in FIG. 2 shows two infrared cameras 12, one optical camera 11, two lidars 14, and one radar 13, but the number of each sensor is suggested only for illustrative purposes and is not limited thereto.

Referring to FIG. 2, the automotive sensor integration module 100 according to an exemplary embodiment of the present invention may include a circuit board 5, an infrared camera 12, an optical camera 11, a radar 13, and a lidar 14. For example, the automotive sensor integration module 100 according to an exemplary embodiment of the present invention may include a circuit board 5 on which an infrared camera 12, an optical camera 11, a radar 13, and a lidar 14 are disposed and mounted.

The optical camera 11 designed to acquire outside images of a vehicle through light and recognize objects, light, and people around the vehicle may include a mono camera, a stereo camera, an around view monitoring (AVM) camera, and a 360-degree camera. The optical camera 11 has advantages of being able to detect colors and accurately classify objects compared to other sensors, but has a disadvantage of being affected by environmental factors, such as darkness, backlight, snow, rain, fog, etc.

The radar 13 may detect an object on the basis of a time-of-flight (TOF) method or a phase-shift method through electromagnetic waves, and detect the location of a detected object, the distance to the detected object, and the relative speed. The radar 13 has an advantage of being capable of long distance detection without being affected by environmental factors, such as darkness, snow, rain, fog, etc., but has a disadvantage of failing to detect an object, made of an electromagnetic wave-absorbing material, for example, a steel structure, such as a tunnel or a guardrail, and thus, being unable to classify objects.

The lidar 14 may detect an object on the basis of a TOF method or a phase-shift method through laser light, and detect the location of a detected object, the distance to the detected object, and the relative speed. The lidar 14 has advantages of being less affected by environmental factors such as darkness, snow, rain, fog, etc., efficient in long- and short-distance detection due to high resolution, and objects are able to be simply classified, but has a disadvantage of failing to measure the speed of objects immediately.

The infrared camera 12 may acquire outside images of a vehicle through infrared rays. In particular, the infrared camera 12 may acquire outside images of the vehicle even in darkness at night. The infrared camera 12 has advantages of being capable of long distance detection and being capable of distinguishing living things from objects without being affected by environmental factors such as darkness, snow, rain, fog, etc. but has a disadvantage of being expensive.

As such, in order to accurately classify and identify external objects around a vehicle regardless of environmental factors, the advantages and disadvantages of each sensor must be combined. Therefore, the automotive sensor integration module 100 according to an exemplary embodiment of the present invention discloses a structure in which a plurality of different sensors are all disposed and mounted on a circuit board 5. In addition, the automotive sensor integration module 100 according to an exemplary embodiment of the present invention may synchronize and output detection results of a plurality of sensors having different operation cycles, thereby having an advantage of classifying and identifying objects more accurately.

Figure 3:
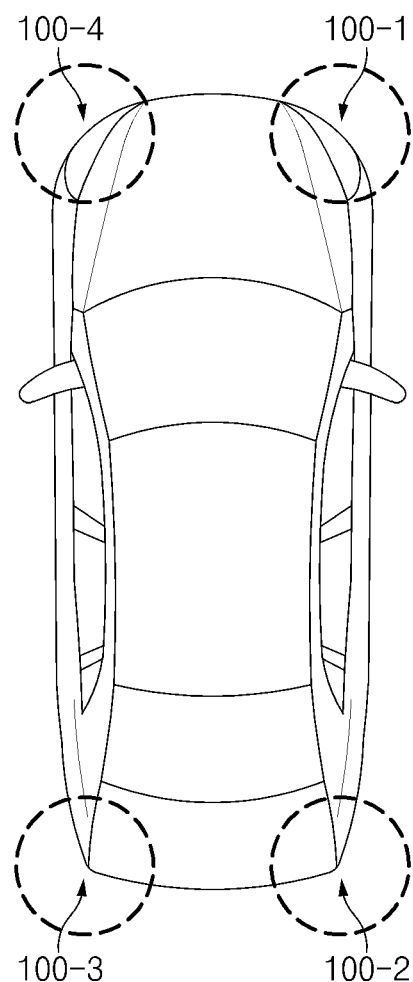
FIG. 3 illustrates a vehicle in which an automotive sensor integration module according to an exemplary embodiment of the present invention is arranged.

FIG. 3 illustrates a vehicle in which the automotive sensor integration module 100, according to an exemplary embodiment of the present invention, is arranged.

With reference to FIG. 3, the automotive sensor integration module 100, according to an exemplary embodiment of the present invention, is represented by a plurality of automotive sensor integration modules 100-1, 100-2, 100-3, 100-4 may be arranged in a vehicle in order to detect an object outside the vehicle.

FIG. 3 illustrates that four automotive sensor integration modules 100-1, 100-2, 100-3, 100-4 are arranged in the vehicle as an example, but the inventive concepts are not limited thereto. In addition, FIG. 3 illustrates an example in which the automotive sensor integration modules 100-1, 100-2, 100-3, 100-4 are respectively arranged at the left and right sides of the front part of the vehicle in order to detect right and left objects in front of the vehicle, and the automotive sensor integration modules are respectively arranged at the left and right sides of the rear part of the vehicle in order to detect right and left objects in back of the vehicle.

Figure 4:
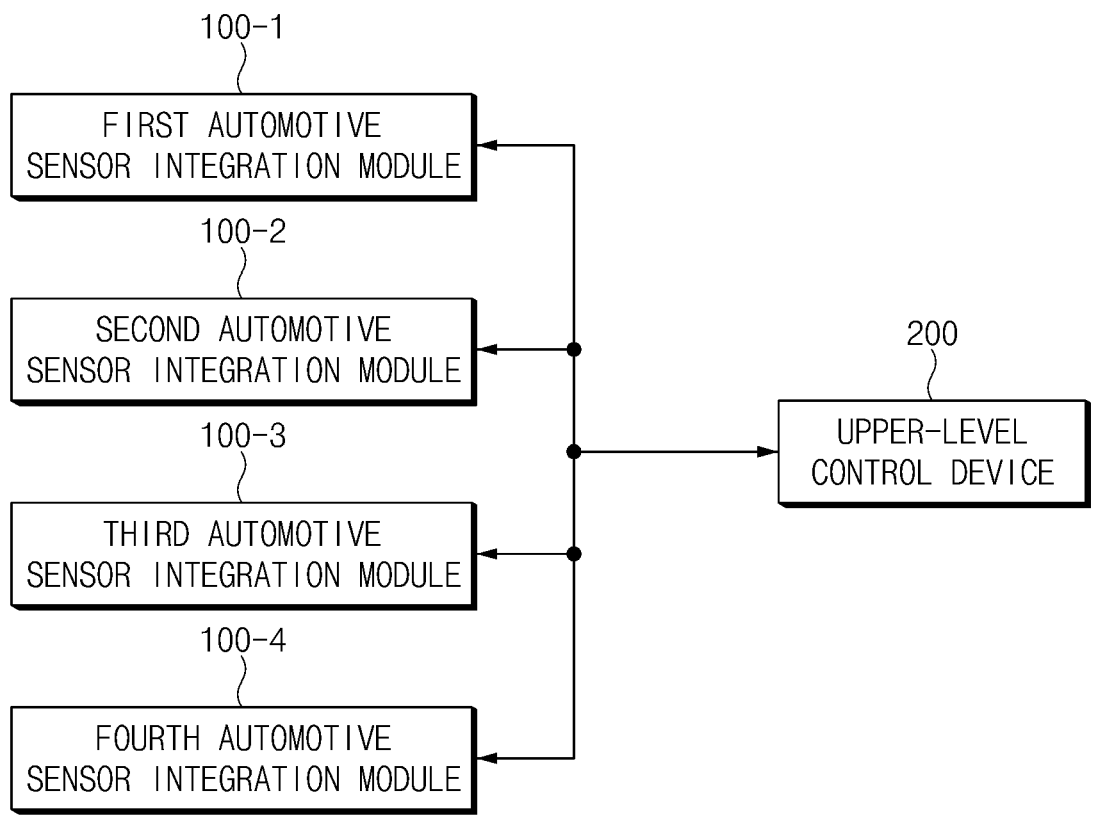
FIG. 4 illustrates a configuration of a vehicle in which an automotive sensor integration module according to an exemplary embodiment of the present invention is arranged.

FIG. 4 illustrates a configuration of a vehicle in which an automotive sensor integration module 100 according to an exemplary embodiment of the present invention is arranged. For example, in case in which four automotive sensor integration modules 100-1, 100-2, 100-3, 100-4 are arranged in the vehicle as shown in FIG. 3, the vehicle may include first-to-fourth automotive sensor integration modules 100-1, 100-2, 100-3, and 100-4 and an upper-level control device 200 as shown in FIG. 4.

The first-to-fourth automotive sensor integration modules 100-1, 100-2, 100-3, and 100-4 may be connected with the upper-level control device 200 through wired/wireless communication. The first-to-fourth automotive sensor integration modules 100-1, 100-2, 100-3, and 100-4 may also be connected to each other through wired/wireless communication. For example, the first-to-fourth automotive sensor integration modules 100-1, 100-2, 100-3, and 100-4 and the upper-level control device 200 may be connected through at least one or more communication manners among Controller Area Network (CAN) communication, Local Interconnect Network (LIN) communication, Flex-ray® communication and Ethernet communication.

Each of the first-to-fourth automotive sensor integration modules 100-1, 100-2, 100-3, and 100-4 may deliver detected object information to the upper-level control device 200 as sensing data. In addition, any one among the first-to-fourth automotive sensor integration modules 100-1, 100-2, 100-3, and 100-4 may provide a synchronization pulse to the remaining automotive sensor integration modules.

The automotive sensor integration module for providing the synchronization pulse among the first-to-fourth automotive sensor integration modules 100-1, 100-2, 100-3, and 100-4 may be selected according to a preset priority or by the upper-level control device 200. For example, if the preset priority is the order of the first automotive sensor integration module 100-1, the second automotive sensor integration module 100-2, the third automotive sensor integration module 100-3, and the fourth automotive sensor integration module 100-4, a synchronization pulse generated first from the first automotive sensor integration module 100-1 may be provided to the second-to-fourth automotive sensor integration modules 100-2, 100-3, and 100-4.

Then, if the first automotive sensor integration module 100 malfunctions or fails, a synchronization pulse generated from the second automotive sensor integration module 100-2 may be provided to the first automotive sensor integration module 100-1, the third automotive sensor integration module 100-3, and the fourth automotive sensor integration module 100-4.

If the second automotive sensor integration module 100-2 malfunctions or fails, the third automotive sensor integration module 100-3 may generate a synchronization pulse to provide the same to other automotive sensor integration modules. In this way, any one among the first-to-fourth automotive sensor integration modules 100-1, 100-2, 100-3 and 100-4 may generate a synchronization pulse according to the preset priority, and provide the generated synchronization pulse to the remaining automotive sensor integration module.

On the other hand, the upper-level control device 200 may select any one among the first-to-fourth automotive sensor integration modules 100-1, 100-2, 100-3, and 100-4 and the selected automotive sensor integration module may generate a synchronization pulse. In addition, the synchronization pulse generated by the selected automotive sensor integration module 100-1, 100-2, 100-3, or 100-4 may be provided to the remaining automotive sensor integration modules that are not selected by the upper-level control device 200.

The automotive sensor integration module 100-1, 100-2, 100-3, or 100-4 for generating the synchronization pulse and the remaining automotive sensor integration modules for receiving the synchronization pulse may output, as the sensing data, the detected object information at the substantially same timing to the upper-level control device 200.

The upper-level control device 200 may be a separate device for controlling the automotive sensor integration modules 100-1, 100-2, 100-3, and 100-4, a device included in an autonomous traveling system or an ADAS to identify an object or control driving of a vehicle.

Figure 5:
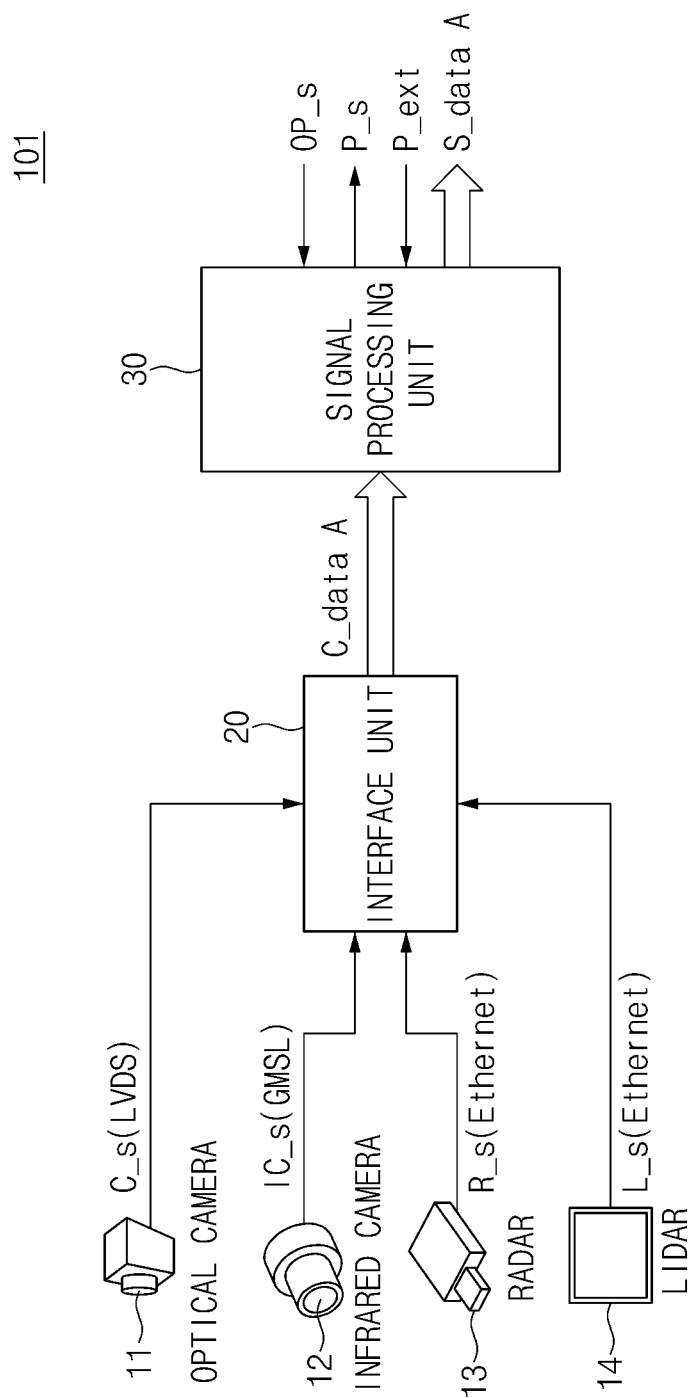
FIG. 5 illustrates a configuration of the first automotive sensor integration module of FIG. 4.

FIG. 5 illustrates a configuration of the first automotive sensor integration module of FIG. 4. Since the first-to-fourth automotive sensor integration modules 100-1, 100-2, 100-3 and 100-4 have the same configuration, the description about the configuration of the first automotive sensor integration module 100-1 will be given and apply to the second-to-fourth automotive sensor integration module 100-2, 100-3, and 100-4.

With reference to FIG. 5, the first automotive sensor integration module 100-1 may include an optical camera 11, an infrared camera 12, a radar 13, a lidar 14, an interface unit 20, and a signal processing unit 30. Here, the interface unit 20 and the signal processing unit 30 may be implemented as hardware or software in the circuit board illustrated in FIG. 2.

The optical camera 11 may output information sensed through light as first detection data C_s.

The infrared camera 12 may output information sensed through an infrared ray as second detection data IC_s.

The radar 13 may output information sensed through an electromagnetic wave as third detection data R_s.

The lidar 14 may output information sensed through laser light as fourth detection data L_s. Here, the detection data C_s, IC_s, R_s, and L_s respectively output from the optical camera 11, the infrared camera 12, the radar 13 and the lidar 14 may have different communication specifications. For example, the first detection data C_s output from the optical camera 11 may be data in a format used in a Low Voltage Differential Signal (LVDS) communication. The second detection data IC_s output from the infrared camera 12 may be data in a format used in a Gigabit Multimedia Serial Link (GMSL) communication. Data output from the radar 13 and the lidar 14 may be data in a format used in Ethernet.

The interface unit 20 may convert different data formats of the first-to-fourth pieces of detection data C_s, IC_s, R_s, and L_s into preset data formats. For example, the interface unit 20 may convert the formats of the first-to-fourth pieces of detection data C_s, IC_s, R_s, and L_s into the same single preset data format.

The interface unit 20 may convert the formats of the first-to-fourth pieces of detection data C_s, IC_s, R_s into a data format according to a preset communication technology among automotive network communication technologies, and provide the format-converted first-to-fourth pieces of detection data C_s, IC_s, R_s to the signal processing unit 30 as first conversion data C-dataA.

Here, the automotive network communication technologies may include a CAN communication, a LIN communication, a Flex-Ray® communication, Ethernet, and so on. For example, the interface unit 20 may convert the formats of the first-to-fourth pieces of detection data C_s, IC_s, R_s, and L_s into a data format for the Ethernet communication.

The signal processing unit 30 may receive, as an external pulse P_ext, the first-to-fourth pieces of detection data C_s, IC_s, R_s, and L_s of which formats are converted by the interface unit 20 and the priority signal OP_s, and generate the synchronization pulse P_s. The signal processing unit 30 may synchronize, with a preset timing, the first-to-fourth pieces of detection data C_s, IC_s, R_s, and L_s of which formats are converted by the interface unit 20, namely, first conversion data C_data A to output the synchronized conversion data C_data A to the upper-level control device 200 as first sensing data S_data A. For example, the signal processing unit 30, which receives the activated priority signal OP_s, may output, as the first sensing data S_data A, the first-to-fourth pieces of detection data C_s, IC_s, R_s, and L_s of which formats are converted based on an input timing of any one of the first-to-fourth detection data C_s, IC_s, R_s, and L_s at the substantially same timing.

For a more specific example, the signal processing unit 30, which receives the activated priority signal OP_s, receives and stores the first-to-fourth pieces of detection data C_s, IC_s, R_s, and L_s of which formats are converted, and generates the synchronization pulse P_s when a preset time elapses after the third detection data R_s has been input to the signal processing unit 30. Then, the signal processing unit 30 may output, as the first sensing data S_data A, the first-to-fourth pieces of detection data C_s, IC_s, R_s, and L_s stored with the formats thereof converted based on the synchronization pulse P_s.

The synchronization pulse P_s, which is generated by the signal processing unit 30 that has received the activated priority signal OP_s, may be provided to the other automotive sensor integration modules, namely, the second-to-fourth automotive sensor integration module 100-2, 100-3, and 100-4.

On the other hand, when receiving the activated priority signal OP_s, the signal processing unit 30 may output, as the first sensing data S_data A, the first-to-fourth pieces of detection data C_s, IC_s, R_s, and L_s stored with the formats converted based on the synchronization pulse P_s that has been generated by any one among the other automotive sensor integration modules, namely, second-to-fourth detection automotive sensor integration modules.

Here, the priority signal OP_s may be a signal generated according to a preset priority or a signal provided from the upper-level control device 200. In addition, the activated priority signal OP_s may be provided only to any one automotive sensor integration module among the first-to-fourth automotive sensor integration modules 100-1, 100-2, 100-3 and 100-4, and a deactivated priority signal OP_s may be provided to the remaining automotive sensor integration modules.

Figure 6:
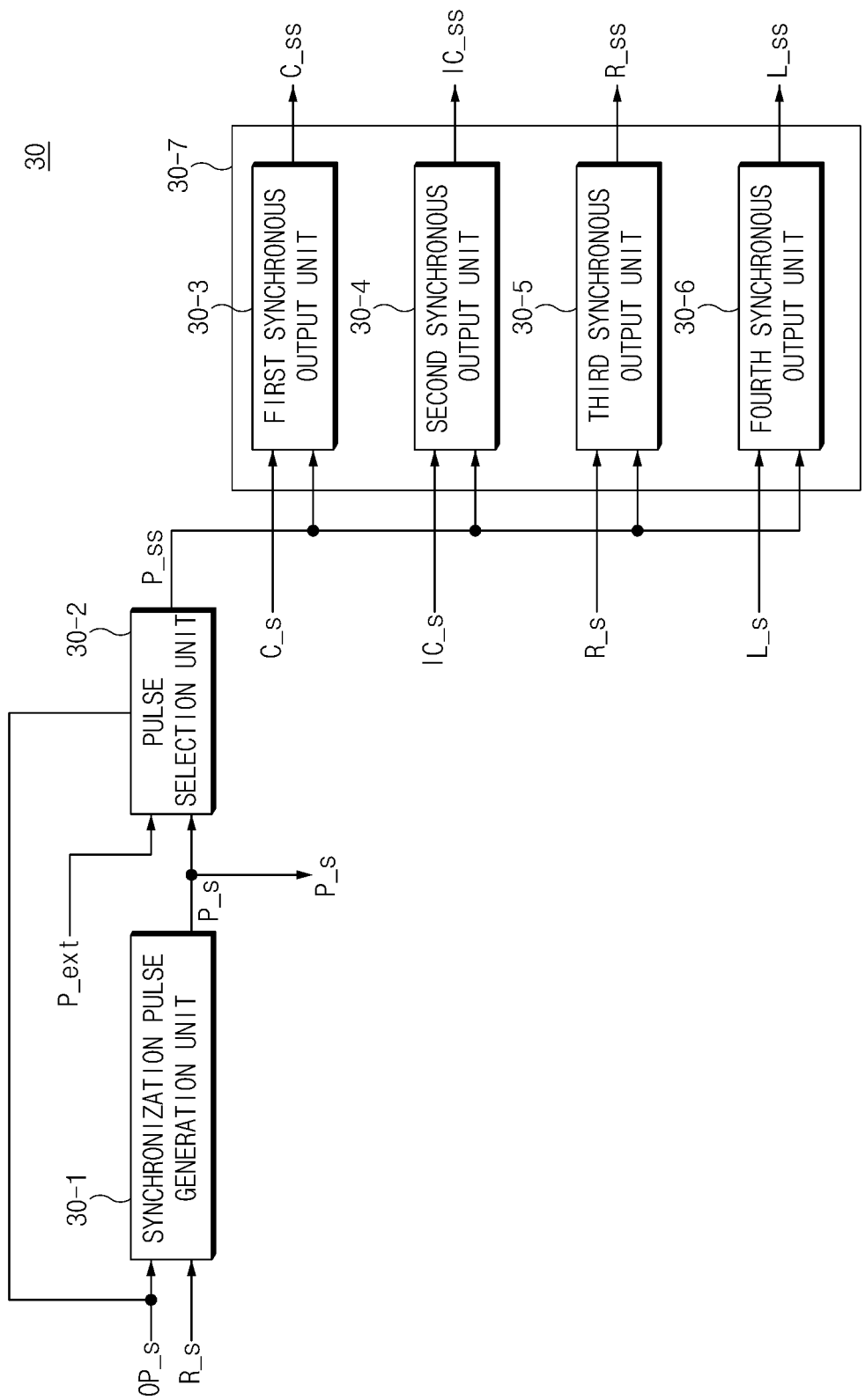
FIG. 6 illustrates a configuration of the signal processing unit illustrated in FIG. 4.

FIG. 6 illustrates a configuration of the signal processing unit 30 illustrated in FIG. 5.

With reference to FIG. 6, the signal processing unit 30 may include a synchronization pulse generation unit 30-1, a pulse selection unit 30-2, and an output synchronization unit 30-7.

The signal processing unit 30 may receive, from the interface unit 20, the first-to-fourth detection pieces of data C_S, IC_s, R_s and L_s of which formats are converted. In addition, the signal processing unit 30 may receive the priority signal OP_s and an external pulse P_ext. Here, the external pulse P_ext may be a synchronization pulse provided from another automotive sensor integration module.

Hereinafter, although, in an explanation about the signal processing unit 30, the first-to-fourth pieces of detection data C_S, IC_s, R_s and L_s of which formats are converted by the interface unit 20 are simply referred to as first-to-fourth pieces of detection data C_s, IC_s, R_s, and L_s, the first-to-fourth pieces of detection data C_s, IC_s, R_s, and L_s input to the synchronization pulse generation unit 30-1 and the first-to-fourth synchronous output unit 30-3, 30-4, 30-5, and 30-6, which form the signal processing unit 30, are pieces of data of which formats are converted by the interface unit 30.

The synchronization pulse generation unit 30-1, which has received the activated priority signal OP_s, receives any one piece of detection data among the first-to-fourth pieces of detection data C_s, IC_s, R_s and L_s to output the synchronization pulse P_s. For example, when the priority signal OP_s is activated, if the synchronization pulse generation unit 30-1 receives the third detection data R_s among the first-to-fourth pieces of detection data C_s, IC_s, R_s and L_s and a preset time elapses, the synchronization pulse generation unit 30-1 may generate and output the synchronization pulse P_s.

Here, the synchronization pulse P_s output from the synchronization pulse generation unit 30-1, which has received the activated priority signal OP_s, is also provided to the pulse selection unit 30-2 shown in FIG. 6, but may be provided as the external pulse P_ext to the second to fourth automotive sensor integration modules 100-2, 100-3, and 100-4 shown in FIG. 4.

On the other hand, the synchronization pulse generation unit 30-1, which has received the deactivated priority signal OP_s, may be blocked from generating the synchronization pulse P_s regardless of the third detection data R_s.

The pulse selection unit 30-2 may receive the priority signal OP_s, the external pulse P_ext, and the synchronization pulse P_s, and output a selection pulse P_ss. The pulse selection unit 30-2 may output, as the selection pulse P_ss, one of the external pulse P_ext and the synchronization pulse P_s based on the priority signal OP_s. For example, if the priority signal OP_s is activated, the pulse selection unit 30-2 may output the synchronization pulse P_s as the selection pulse P_ss. If the priority signal OP_s is deactivated, the pulse selection unit 30-2 may output the external pulse P_ext as the selection pulse P_ss.

The output synchronization unit 30-7 may receive and store the first-to-fourth pieces of detection data C_s, IC_s, R_s and L_s, and output, as the first sensing data S_data A, the stored first-to-fourth pieces of detection data C_s, IC_s, R_s and L_s based on the selection pulse P_ss. Here, the first sensing data S_data A may include the first-to-fourth detection data C_s, IC_s, R_s and L_s.

The output synchronization unit 30-7 may include a first synchronous output unit 30-3, a second synchronous output unit 30-4, a third synchronous output unit 30-5, and a fourth synchronous output unit 30-6.

The first synchronous output unit 30-3 may receive the first detection data C_s and the selection pulse P_ss, and output the first detection data C_s as the first sensing data S_data A; C_ss. For example, the first synchronous output unit 30-3 may receive and store the first detection data C_s, and output the stored first detection data C_s as the first sensing data S_data A; C_ss based on the selection pulse P_ss. In more detail, the first synchronous output unit 30-3 may receive and store the first detection data C_s, and, if the selection pulse P_ss is input, may output the stored first detection data C_s as the first sensing data S_data A; C_ss.

The second synchronous output unit 30-4 may receive the second detection data IC_s and the selection pulse P_ss, and output the second detection data IC_s as the first sensing data S_data A; IC_ss. For example, the second synchronous output unit 30-4 may receive and store the second detection data IC_s, and output the stored second detection data IC_s as the first sensing data S_data A; IC_ss based on the selection pulse P_ss. In more detail, the second synchronous output unit 30-4 may receive and store the second detection data IC_s, and, if the selection pulse P_ss is input, may output the stored second detection data IC_s as the first sensing data S_data A; IC_ss.

The third synchronous output unit 30-5 may receive the third detection data R_s and the selection pulse P_ss, and output the third detection data R_s as the first sensing data S_data A; R_ss. For example, the third synchronous output unit 30-5 may receive and store the third detection data R_s, and output the stored third detection data R_s as the first sensing data S_data A; R_ss based on the selection pulse P_ss. In more detail, the third synchronous output unit 30-5 may receive and store the third detection data R_s, and, if the selection pulse P_ss is input, may output the stored third detection data R_s as the first sensing data S_data A; R_ss.

The fourth synchronous output unit 30-6 may receive the fourth detection data L_s and the selection pulse P_ss, and output the fourth detection data L_s as the first sensing data S_data A; L_ss. For example, the fourth synchronous output unit 30-6 may receive and store the fourth detection data L_s, and output the stored fourth detection data L_s as the first sensing data S_data A; L_ss based on the selection pulse P_ss. In more detail, the fourth synchronous output unit 30-4 may receive and store the fourth detection data L_s, and, if the selection pulse P_ss is input, may output the stored fourth detection data L_s as the first sensing data S_data A; L_ss.

Here, each of the first-to-fourth synchronous output units 32, 33, 34 and 35 may be configured by including a register.

An operation of the first automotive sensor integration module 100-1 shown in FIG. 5 is as follows.

As shown in FIG. 5, the first automotive sensor integration module 100-1 may include a plurality of sensors for detecting an object outside a vehicle, and the plurality of sensors may include an optical camera 11, an infrared camera 12, a radar 13 and a lidar 14. The sensors having different media for sensing the object may output the sensing results in different communication formats. Accordingly, the automotive sensor integration module according to an embodiment of the present invention may include the interface unit 20 so as to convert the detection results of respective sensors output as different pieces of communication format data into a preset communication format data.

In addition, the optical camera 11, the infrared camera 12, the radar 13 and the lidar 14 may have respectively different sensing (operation) periods. For example, the optical camera 11 and the infrared camera 12 may have a 30 Hz sensing period, the radar 12 may have a 20 Hz sensing period, and the lidar 14 may have a 10 Hz sensing period. Accordingly, the optical camera 11 and the infrared camera 12 may respectively output the first and second pieces of detection data C_s and IC_s every first time (33 ms), the radar 13 may output the third detection data R_s every second time (50 ms), and the lidar 14 may output the fourth detection data L_s every third time (100 ms).

In order to accurately determine the object outside the vehicle, pieces of detection data detected at the substantially same time from the optical camera 11, the infrared camera 12, the radar 13 and the lidar 14 are necessary. However, as described above, the optical camera 11, the infrared camera 12, the radar 13 and the lidar 14 have respectively different sensing periods and thus, it is difficult to determine the object.

When the priority signal OP_s is activated, the first automotive sensor integration module 100-1 may synchronize the pieces of detection data from the optical camera 11, the infrared camera 12, the radar 13 and the lidar 14 according to any one sensing period of the optical camera 11, the infrared camera 12, the radar 13 and the lidar 14, and output the synchronized detection data. In addition, if the first automotive sensor integration module 100-1 receives the deactivated priority signal OP_s, the first automotive sensor integration module 100-1 may synchronize the detection data from the optical camera 11, the infrared camera 12, the radar 13, and the lidar 14 based on the synchronization pulse P_ext provided from the automotive sensor integration module that receives the activated priority signal OP_s, and output the synchronized detection data.

The first-to-fourth automotive sensor integration modules 100-1, 100-2, 100-3, and 100-4 shown in FIG. 4 may be configured identically. Accordingly, an automotive sensor integration module, which receives the activated priority signal OP_s, among the first-to-fourth automotive sensor integration modules 100-1, 100-2, 100-3 and 100-4 generates the synchronization pulse P_s according to any one of sensing periods of the optical camera 11, the infrared camera 12, the radar 13, and the lidar 14 included therein. In addition, the first-to-fourth automotive sensor integration modules 100-1, 100-2, 100-3 and 100-4 may output, at the substantially same timing, detection results of the optical cameras 11, the infrared cameras 12, the radars 13, and the lidars 14 based on the generated synchronization pulse P_s, and provide, as the external pulse P_ext, the synchronization pulse P_s to the other automotive integration modules that receive the deactivated priority signal OP_s.

The automotive sensor integration modules, which receive the deactivated priority signal OP_S, may output the detection results from the optical camera 11, the infrared camera 12, the radar 13, and the lidar 14 included therein at the substantially same timing according to the external pulse P_ext.

In the end, each of the first-to-fourth automotive sensor integration modules 100-1, 100-2, 100-3 and 100-4 may output the detection results from a plurality of sensors (e.g. the optical camera, the infrared camera, the radar, and the lidar) included therein at the substantially same timing.

In addition, based on the synchronization pulse P_s output from any one among the first-to-fourth automotive sensor integration modules 100-1, 100-2, 100-3 and 100-4, object information detected from the remaining automotive sensor integration modules, namely, the detection results from the optical camera 11, the infrared camera 12, the radar 13, and the lidar 14 may be output at the substantially same timing.

Accordingly, the automotive sensor integration module 100 according to an exemplary embodiment of the present invention may not only substantially simultaneously output the detection results from the plurality of sensors (e.g. the optical camera 11, the infrared camera 12, the radar 13, and the lidar 14), but also output the detection result at the substantially same timing with the other automotive sensor integration modules, and thus is beneficial to determine the object outside the vehicle.

An operation that the plurality of automotive sensor integration modules, for example, the first-to-fourth automotive sensor integration modules 100-1, 100-2, 100-3, and 100-4, output detection results for the external object at the substantially same timing will be described with reference to FIG. 7 as follows.

Here, each of the first-to-fourth automotive sensor integration modules 100-1, 100-2, 100-3, and 100-4 shown in FIG. 4 may include, as an object detection sensor, the optical camera 11, the infrared camera 12, the radar 13, and the lidar 14, as shown in FIG. 5. In addition, each of the first-to-fourth automotive sensor integration modules 100-1, 100-2, 100-3, and 100-4 may include the interface unit 20 for receiving the outputs from the object detection sensors, and the signal processing unit 30 for receiving the output from the interface unit 20.

The interface unit 20 included in the first automotive sensor integration module 100-1 may output the first conversion data C_data A to the signal processing unit 30, and the signal processing unit 30 may output the first sensing data S_data A. Here, the first conversion data C_data A may include detection data detected from the optical camera 11, the infrared camera 12, the radar 13, and the lidar 14 included in the first automotive sensor integration module 100-1.

The interface unit 20 included in the second automotive sensor integration module 100-2 may output second conversion data C_data B to the signal processing unit 30 included in the second automotive sensor integration module 100-2, and the signal processing unit 30 may output second sensing data S_data B. Here, the second conversion data C_data B may include detection data detected from the optical camera 11, the infrared camera 12, the radar 13, and the lidar 14 included in the second automotive sensor integration module 100-2.

The interface unit 20 included in the third automotive sensor integration module 100-3 may output third conversion data C_data C to the signal processing unit 30 included in the third automotive sensor integration module 100-3, and the signal processing unit 30 may output third sensing data S_data C. Here, the third conversion data C_data C may include detection data detected from the optical camera 11, the infrared camera 12, the radar 13, and the lidar 14 included in the third automotive sensor integration module 100-3.

The interface unit 20 included in the fourth automotive sensor integration module 100-4 may output fourth conversion data C_data D to the signal processing unit 30 included in the fourth automotive sensor integration module 100-4, and the signal processing unit 30 may output fourth sensing data S_data D. Here, the fourth conversion data C_data D may include detection data detected from the optical camera 11, the infrared camera 12, the radar 13, and the lidar 14 included in the fourth automotive sensor integration module 100-4.

Figure 7:
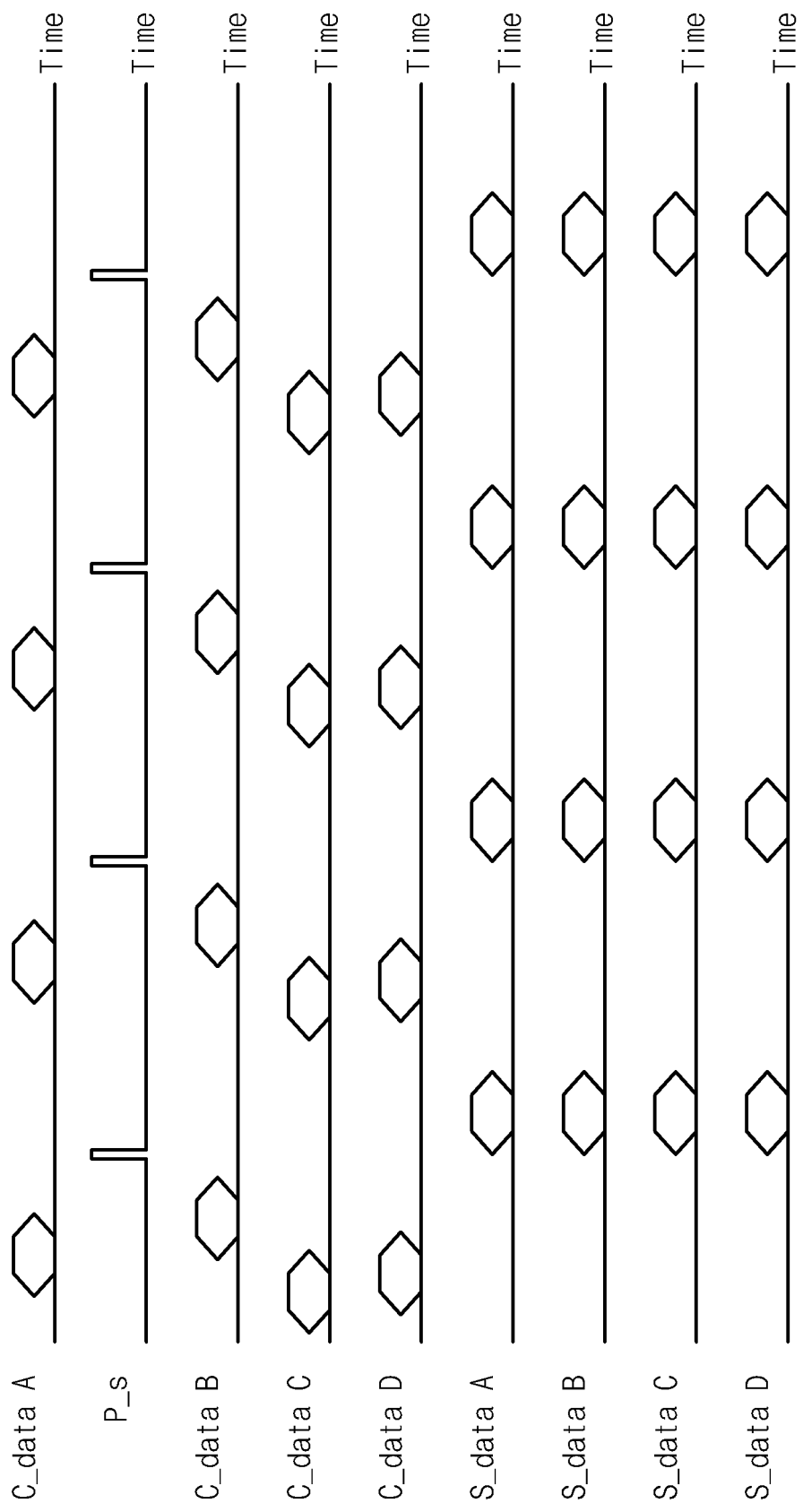
FIG. 7 is a timing diagram for explaining an operation of an automotive sensor integration module according to an exemplary embodiment of the present invention.

FIG. 7 is a timing diagram for explaining the operation of the automotive sensor integration module 100 according to an exemplary embodiment of the present invention. In detail, FIG. 7 is a drawing illustrating operation timings of the first-to-fourth automotive sensor integration modules 100-1, 100-2, 100-3, and 100-4 shown in FIG. 4.

Each of the plurality of automotive sensor integration modules, namely, the first-to-fourth automotive sensor integration modules 100-1, 100-2, 100-3, and 100-4 according to an exemplary embodiment of the present invention is exemplarily explained for a configuration that the pieces of detection data from the optical camera 11, the infrared camera 12, the radar 13, and the lidar 14 are synchronized and output based on the sensing period of the radar 13 among the optical camera 11, the infrared camera 12, the radar 13, and the lidar 14, but the inventive concepts are not limited to the case in which the detection data from the other sensors are synchronized based only on the sensing period of the radar 13.

In addition, the explanation is provided on the assumption that the automotive sensor integration module, which receives the activated priority signal OP_s, is the first automotive sensor integration module 100-1 among the first-to-fourth automotive sensor integration modules 100-1, 100-2, 100-3, and 100-4, but the inventive concepts are not limited thereto.

Only the automotive sensor integration module among the first-to-fourth automotive sensor integration modules 100-1, 100-2, 100-3, and 100-4, may receive the activated priority signal OP_s, and the remaining automotive sensor integration modules, namely, the second-to-fourth automotive sensor integration modules 100-2, 100-3, and 100-4, may receive the deactivated priority signal OP_s.

Each of the first-to-fourth automotive sensor integration modules 100-1, 100-2, 100-3, and 100-4 may convert the formats of the detection data output from the optical camera 11, the infrared camera 12, the radar 13, and the lidar 14 into a preset data format through the interface unit 20.

Here, the interface unit 20 of the first automotive sensor integration module 100-1 may output the first conversion data C_data A converted into the preset format. The interface unit 20 of the second automotive sensor integration module 100-2 may output the second conversion data C_data B converted into the preset format. The interface unit 20 of the third automotive sensor integration module 100-3 may output the third conversion data C_data C converted into the preset format. The interface unit 20 of the fourth automotive sensor integration module 100-4 may output the fourth conversion data C_data D converted into the preset format.

Here, as shown in FIG. 7, the first-to-fourth pieces of conversion data C_data A, C_data B, C_data C, and C_data D, which have been respectively detected from the optical camera 11, the infrared camera 12, the radar 13, and the lidar 14 of each of the first-to-fourth automotive sensor integration modules 100-1, 100-2, 100-3, and 100-4 and have been converted by each of the interface units 20, may have different output timings from the interface units 20.

The signal processing unit 30 in each of the first-to-fourth automotive sensor integration modules 100-1, 100-2, 100-3 and 100-4 may receive and store the first-to-fourth pieces of conversion data C_data A, C_data B, C_data C, and C_data D.

The first automotive sensor integration module 100-1, which receives the activated priority signal OP_s, may generate the synchronization pulse P_s based on the detection data from any one (e.g. the radar 13) of the optical camera 11, the infrared camera 12, the radar 13, and the lidar 14.

The second-to-fourth automotive sensor integration modules 100-2, 100-3, and 100-4, which receive the deactivated priority signal OP_s, may be provided with the first synchronization pulse P_s generated by the first automotive sensor integration module 100-1.

The first-to-fourth automotive sensor integration modules 100-1, 100-2, 100-3, and 100-4 may output, as the first-to-fourth pieces of sensing data S_data A, S_data B, S_data C, and S_data D, the stored first-to-fourth pieces of conversion data C_data A, C_data B, C_data C, and C_data D at the substantially same timing based on the synchronization pulse P_s generated by the first automotive sensor integration module 100-1.

The automotive sensor integration module, which receives the activated priority signal according to the present invention, may include a plurality of sensors of which sensing periods and output data formats are different, convert the output data formats of the sensors into specific data formats, generate a synchronization pulse based on one sensing period output from one of the plurality of sensors, synchronize the pieces of data of which formats are converted into the specific formats, and output the synchronized data as the sensing data according to the synchronization pulse.

In addition, the automotive sensor integration module, which receives the activated priority signal, may provide the generated synchronization pulse to the other automotive sensor integration modules based on one sensing period of any one among the plurality of sensors.

The automotive sensor integration module, which receives the deactivation priority signal according to the present invention, may convert output data formats of the plurality of sensors into specific data formats, and synchronize the pieces of data of which formats are converted into the specific data formats based on the synchronization pulse provided from another automotive sensor integration module, and output the synchronized data as the sensing data.

Accordingly, since the automotive sensor integration module for receiving the activated priority signal and the automotive sensor integration module for receiving the deactivated priority signal, output the sensing data based on the same synchronization pulse, the output timing of the automotive sensor integration module for receiving the activated priority signal may be synchronized with the output timing of the automotive sensor integration module for receiving the deactivated priority signal.

In the end, even when a plurality of automotive sensor integration modules according to the embodiments of the present invention are arranged in an ADAS or an autonomous traveling vehicle, pieces of sensing data output from the arranged plurality of automotive sensor integration modules are output at the substantially same timing, and thus it may be beneficial to determine the object outside the vehicle.

In addition, since an automotive sensor integration module for generating the synchronization pulse may be selected using a priority signal from among the plurality of automotive sensor integration modules, when the automotive sensor integration module for generating the synchronization pulse may malfunction or fail, another automotive sensor integration module may be set to generate the synchronization pulse, and thus the reliability of the sensing data provided from the automotive sensor integration module may be improved.

In the automotive sensor integration module according to the embodiments of the present invention, a plurality of sensors are synchronously operated, and thus, a determination performance for an object outside a vehicle may be improved.

In addition, the automotive sensor integration module according to the embodiments of the present invention may improve a detection performance for the object outside the vehicle by synchronizing a plurality of outputs from the automotive sensor integration module.

Although the present invention has been described with reference to the drawings exemplified as above, the present invention is not limited to the embodiments and drawings disclosed herein, and it would be obvious that various modifications may be made by those skilled in the art within the scope of the technical spirit of the present invention. Furthermore, it is apparent that, although the effects brought about by the configuration of the present invention are not clearly mentioned while describing the embodiments of the present invention, any effect, which can be predicted from the configuration, can also be acknowledged.

What is claimed is:

1. An automotive sensor integration module comprising:
a plurality of sensors configured to detect an object outside a vehicle;
a signal processor configured to output, as sensing data, a plurality of pieces of detection data output from the plurality of sensors according to any one among the plurality of pieces of detection data at a substantially same timing based on a priority signal, or output, as the sensing data, the plurality of pieces detection data according to an external pulse at a substantially same timing; and
an interface unit configured to:
receive the plurality of pieces of detection data output from the plurality of sensors;
convert formats of the plurality of pieces of detection data into a preset data format; and
deliver the format-converted data to the signal processor,
wherein:
the plurality of sensors are different in at least one among a sensing period and an output data format;
the signal processor receives and stores the format-converted data and simultaneously outputs the format-converted data on the basis of the sensing period of one among the plurality of sensors or the external pulse;
the signal processor generates a synchronization pulse according to the any one piece of detection data or blocks the generation of the synchronization pulse based on the priority signal; and
the external pulse is another synchronization pulse provided from another automotive sensor integration module.

2. The automotive sensor integration module of claim 1, wherein, in response to the priority signal being activated, the signal processor generates the synchronization pulse based on the any one piece of detection data and, in response to the priority signal being deactivated, the signal processor blocks the generation of the synchronization pulse, if the priority signal is deactivated.

3. The automotive sensor integration module of claim 2, wherein, in response to the priority signal being activated, the signal processor generates the synchronization pulse based on the any one piece of detection data and outputs, as the sensing data, the plurality of pieces of detection data based on the synchronization pulse.

4. The automotive sensor integration module of claim 3, wherein, in response to the priority signal being deactivated, the plurality of pieces of detection data are output as the sensing data based on the external pulse.

5. The automotive sensor integration module of claim 1, wherein the plurality of sensors, the interface unit, and the signal processor are all mounted in at least one circuit board.

6. The automotive sensor integration module of claim 5, wherein the plurality of sensors comprise at least one optical camera, at least one infrared camera, at least one radar, and at least one lidar.

* * * * *